US010710540B2

(12) United States Patent
Fukawatase et al.

(10) Patent No.: US 10,710,540 B2
(45) Date of Patent: Jul. 14, 2020

(54) VEHICLE SEAT AND SEAT CUSHION AIRBAG

(71) Applicant: TOYOTA JIDOSHA KABUSHIKI KAISHA, Toyota-shi, Aichi-ken (JP)

(72) Inventors: Osamu Fukawatase, Miyoshi (JP); Shun Ito, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 16/122,388

(22) Filed: Sep. 5, 2018

(65) Prior Publication Data
US 2019/0126878 A1 May 2, 2019

(30) Foreign Application Priority Data

Nov. 2, 2017 (JP) ................... 2017-213186

(51) Int. Cl.
B60R 21/207 (2006.01)
B60N 2/90 (2018.01)
(52) U.S. Cl.
CPC ............ B60R 21/207 (2013.01); B60N 2/914 (2018.02)
(58) Field of Classification Search
CPC ................ B60R 21/207; B60R 21/231; B60R 2021/23386
See application file for complete search history.

(56) References Cited

U.S. PATENT DOCUMENTS

| 7,527,333 | B2* | 5/2009 | Suzuki | B60N 2/42718 280/728.2 |
|---|---|---|---|---|
| 8,641,086 | B2* | 2/2014 | Hashido | B60R 21/207 280/730.1 |
| 10,427,565 | B2* | 10/2019 | Sasaki | B60N 2/42754 |
| 2007/0132214 | A1* | 6/2007 | Suzuki | B60N 2/42718 280/730.1 |
| 2012/0007407 | A1* | 1/2012 | Komamura | B60N 2/4221 297/452.41 |
| 2014/0306497 | A1* | 10/2014 | Fukawatase | B60R 21/207 297/216.1 |
| 2014/0346819 | A1* | 11/2014 | Fukawatase | B60N 2/4221 297/180.1 |
| 2014/0361520 | A1* | 12/2014 | Hirako | B60N 2/42763 280/729 |

(Continued)

FOREIGN PATENT DOCUMENTS

JP 2006-143002 A 6/2006
JP 2007-126117 A 5/2007
(Continued)

Primary Examiner — James A English
(74) Attorney, Agent, or Firm — Oliff PLC

(57) ABSTRACT

A vehicle seat that includes: an inflator that is disposed at a seat front end portion, inside a seat portion of a seat cushion, and that generates gas by operating; a first bag portion that is disposed inside the seat portion, that internally houses the inflator, and that, by being supplied with gas from the inflator, is inflated in a longitudinal direction, which is a seat front-rear direction; and a second bag portion that is disposed inside the seat portion on a seat rear side of the first bag portion and communicates with the first bag portion, that has a longitudinal direction extending in a seat width direction, and that has a length in the seat width direction which is longer than that of the first bag portion.

13 Claims, 7 Drawing Sheets

(56) References Cited

U.S. PATENT DOCUMENTS

| | | | |
|---|---|---|---|
| 2017/0028960 A1* | 2/2017 | Kobayashi | B60N 2/42 |
| 2017/0057385 A1* | 3/2017 | Kanto | B60N 2/42763 |
| 2017/0341615 A1* | 11/2017 | Kobayashi | B60R 21/207 |

FOREIGN PATENT DOCUMENTS

| | | |
|---|---|---|
| JP | 2008-143306 A | 6/2008 |
| JP | 2010-052535 A | 3/2010 |
| JP | 2012-016970 A | 1/2012 |

\* cited by examiner

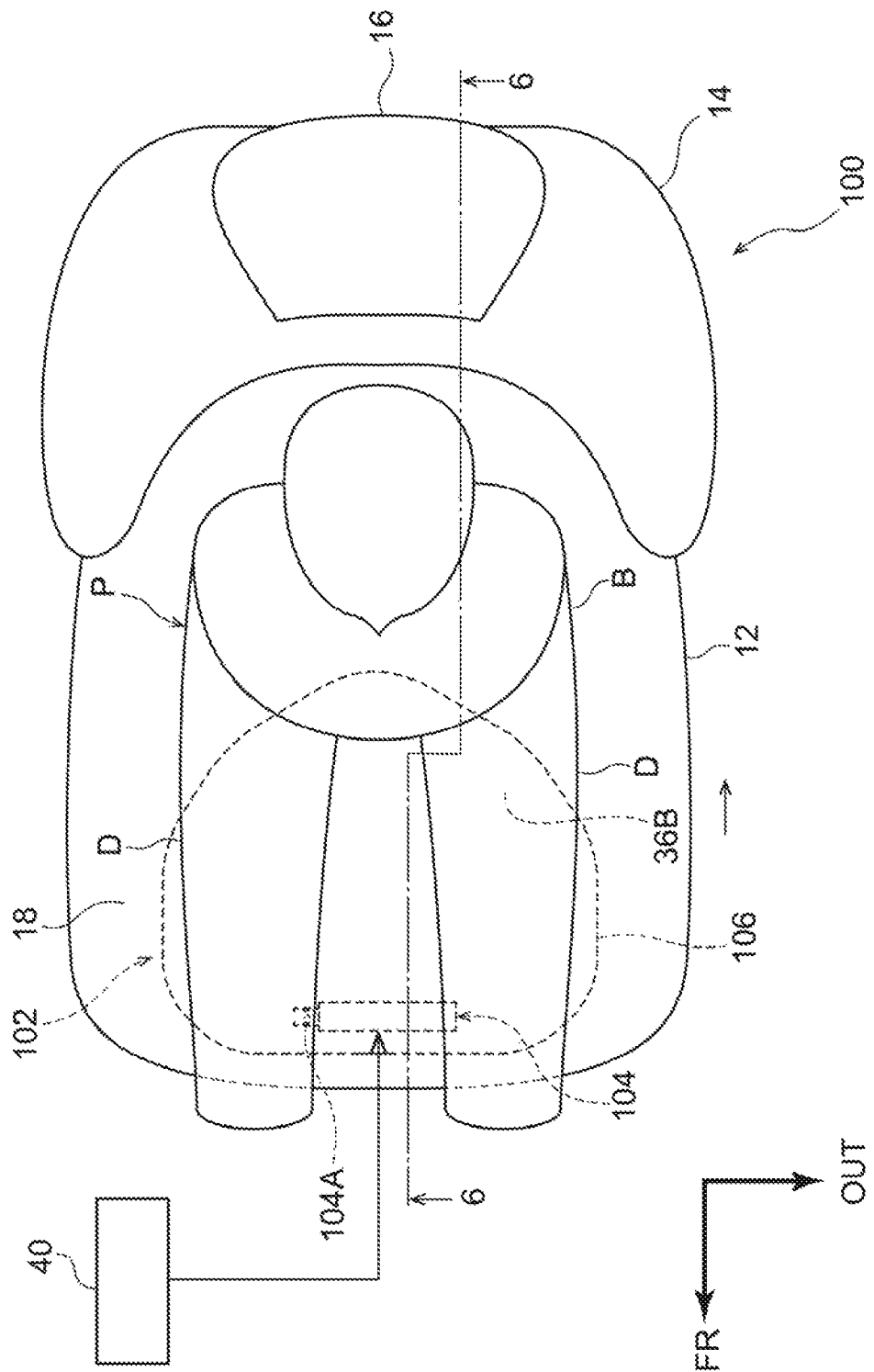

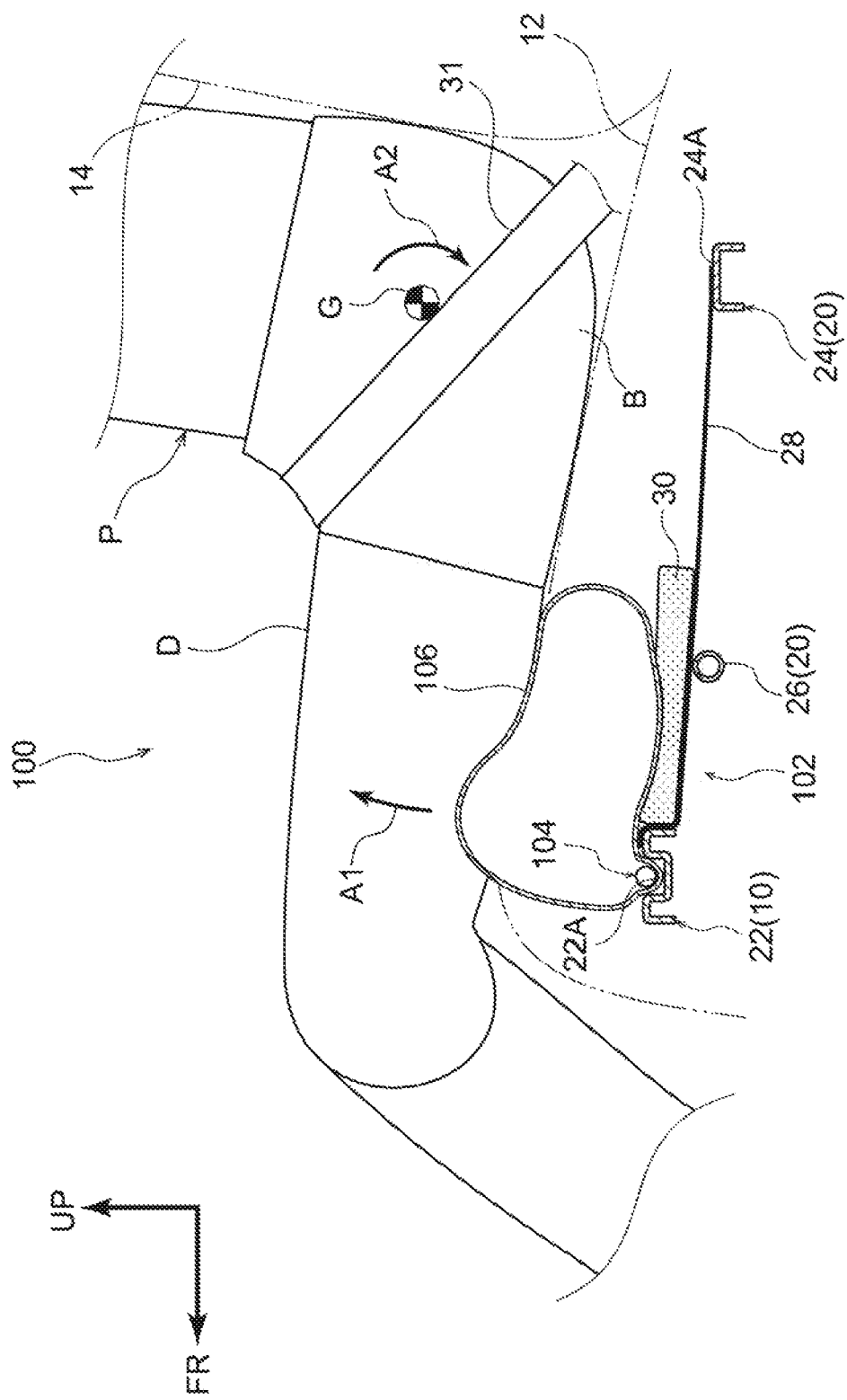

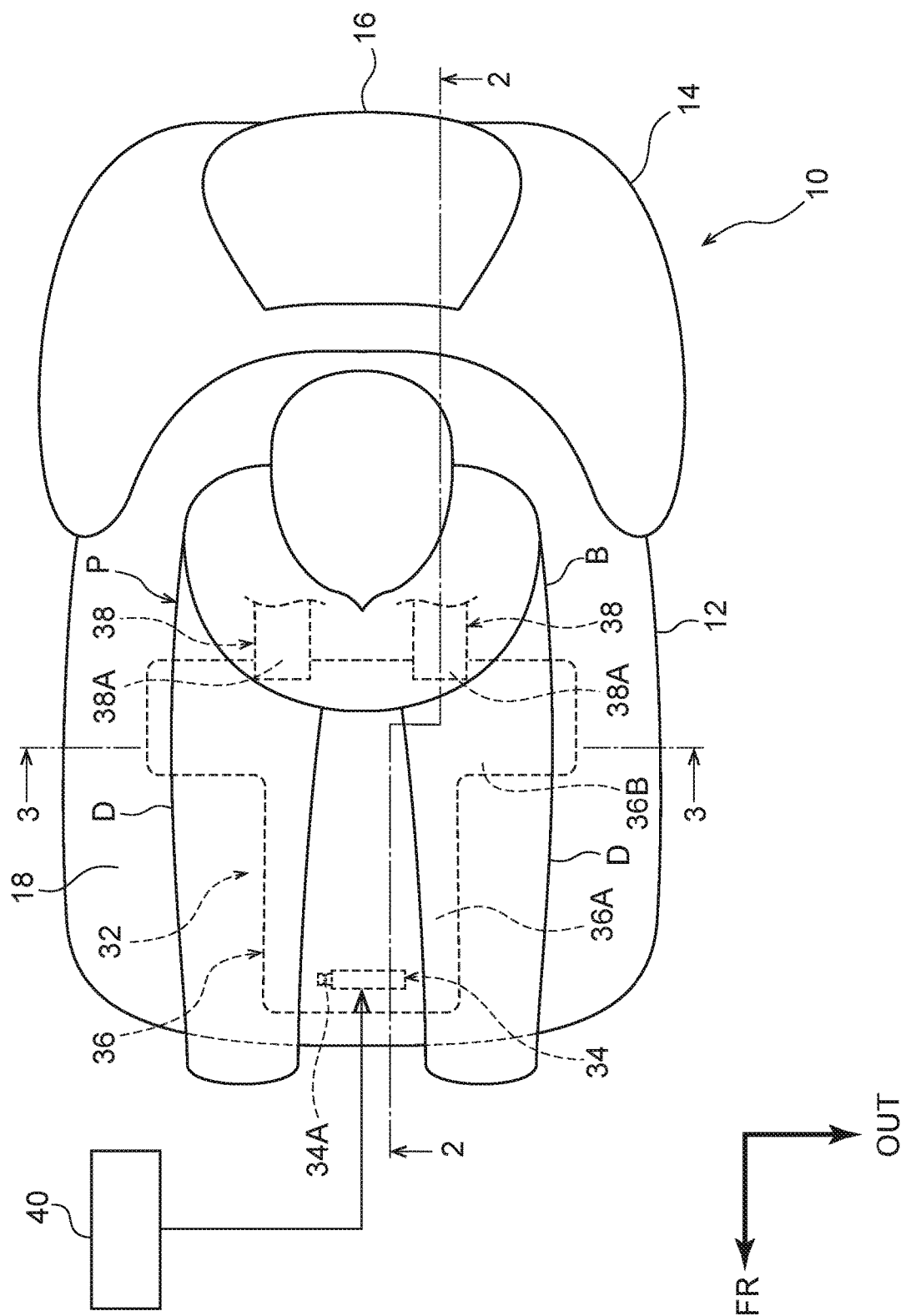

VEHICLE SEAT AND SEAT CUSHION AIRBAG

CROSS-REFERENCE TO RELATED APPLICATION

This application is based on and claims priority under 35 USC 119 from Japanese Patent Application No. 2017-213186 filed on Nov. 2, 2017, the disclosure of which is incorporated by reference herein.

BACKGROUND

Technical Field

The present disclosure relates to a vehicle seat and a seat cushion airbag.

Related Art

A vehicle seat in which a seat cushion airbag is housed between a cushion panel and a seat pad which form a bottom portion of a seat cushion is disclosed in Japanese Unexamined Patent Application (JP-A) No. 2010-52535. The seat cushion airbag described in JP-A No. 2010-52535 is formed substantially in a rectangular shape when looked at in plan view, and an inflator is disposed in a front portion of this seat cushion airbag. In the same way, a vehicle seat described in Japanese Unexamined Patent Application (JP-A) Nos. 2007-126117 and 2008-143306 has been developed as a structure in which a seat cushion airbag which is substantially rectangular when looked at in plan view is provided.

In the vehicle seats disclosed in JP-A Nos. 2010-52535, 2007-126117, and 2008-143306, as a result of the seat cushion airbag inflating towards the seat upper side, the thigh portion of a seat occupant is lifted up towards the seat upper side and movement by the seat occupant towards the seat front side is inhibited. Meanwhile, in recent times, there has been a desire for thinner (i.e., more miniaturized) instrument panels, and it is thought that, if instrument panels are made thinner, the ability to restrain the lower limbs of a seat occupant in the event of a collision or sudden braking will be lessened. Because of this, a vehicle seat and seat cushion airbag are desired that improve the ability to restrain a seat occupant in the event of a vehicle collision or sudden braking.

SUMMARY

An aspect of a vehicle seat includes: an inflator that is disposed at a seat front end portion, inside a seat portion of a seat cushion, and that generates gas by operating; a first bag portion that is disposed inside the seat portion, that internally houses the inflator, and that, by being supplied with gas from the inflator, is inflated in a longitudinal direction, which is a seat front-rear direction; and a second bag portion that is disposed inside the seat portion on a seat rear side of the first bag portion and communicates with the first bag portion, that has a longitudinal direction extending in a seat width direction, and that has a length in the seat width direction which is longer than that of the first bag portion.

BRIEF DESCRIPTION OF THE DRAWINGS

Exemplary embodiments of the present disclosure will be described in detail based on the following figures, wherein:

FIG. 5 is a plan view of a vehicle seat of a comparative example, and shows a state in which a seat cushion airbag has inflated;

FIG. 6 is a cross-sectional view showing a state across a line 6-6 shown in FIG. 5; and FIG. 7 is the plan view of the vehicle seat shown in FIG. 1, except that the length of the first bag portion 36A in the seat width direction is longer as compared to FIG. 1.

DETAILED DESCRIPTION

Hereinafter, a vehicle seat 10 provided with a seat cushion airbag 36 according to an exemplary embodiment of the present disclosure will be described with reference to the drawings. Note that an arrow FR, an arrow UP, and an arrow OUT that are shown in the appropriate drawings respectively indicate a seat forward direction, a seat upward direction, and an outer side in a seat width direction. Hereinafter, if front-rear, left-right, or up-down directions are used in the following description, then, unless specifically stated otherwise, these refer respectively to the front-rear directions of the seat, the left-right directions of the seat (i.e., the seat width direction), and the up-down directions of the seat. Additionally, in the present exemplary embodiment, as an example, the front-rear directions, the left-right directions (i.e., the width direction), and the up-down directions of the vehicle seat 10 coincide respectively with the front-rear, left-right, and up-down directions of a vehicle in which the vehicle seat 10 is mounted.

(Overall Structure of the Vehicle Seat 10)

Figure 1:
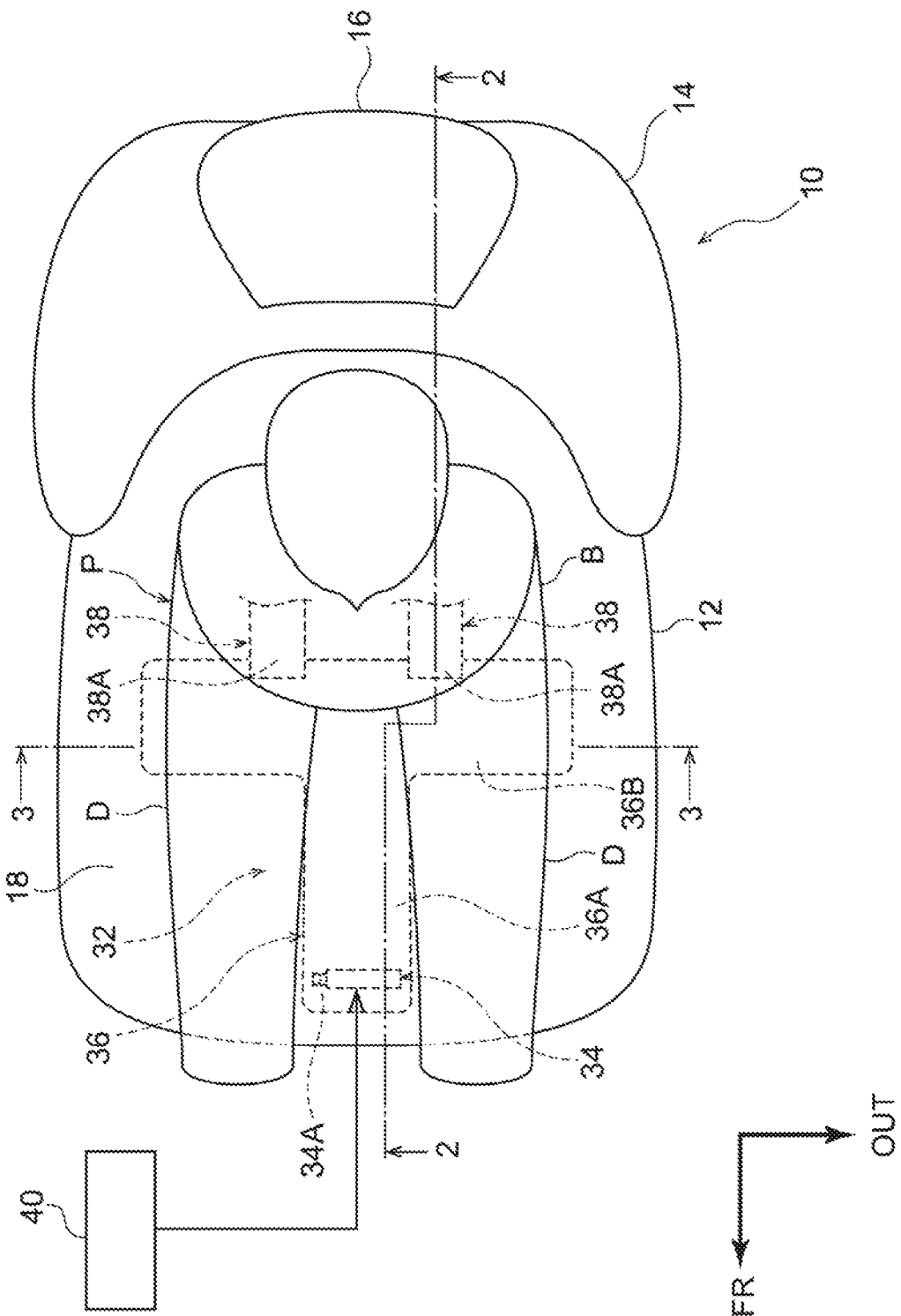
FIG. 1 is a plan view of a vehicle seat according to an exemplary embodiment, and shows a state in which a seat cushion airbag has been inflated.

As is shown in FIG. 1, the vehicle seat 10 according to the present exemplary embodiment is provided with a seat cushion 12, and a buttocks portion B and thigh portion D of a seat occupant P who is seated in the vehicle seat 10 are supported by this seat cushion 12. Moreover, a lower end portion of a seat back 14 is joined to a rear end portion of the seat cushion 12, and a back portion of the seat occupant P is supported by this seat back 14. Additionally, a headrest 16 is provided at an upper end portion of the seat back 14.

Figure 4:
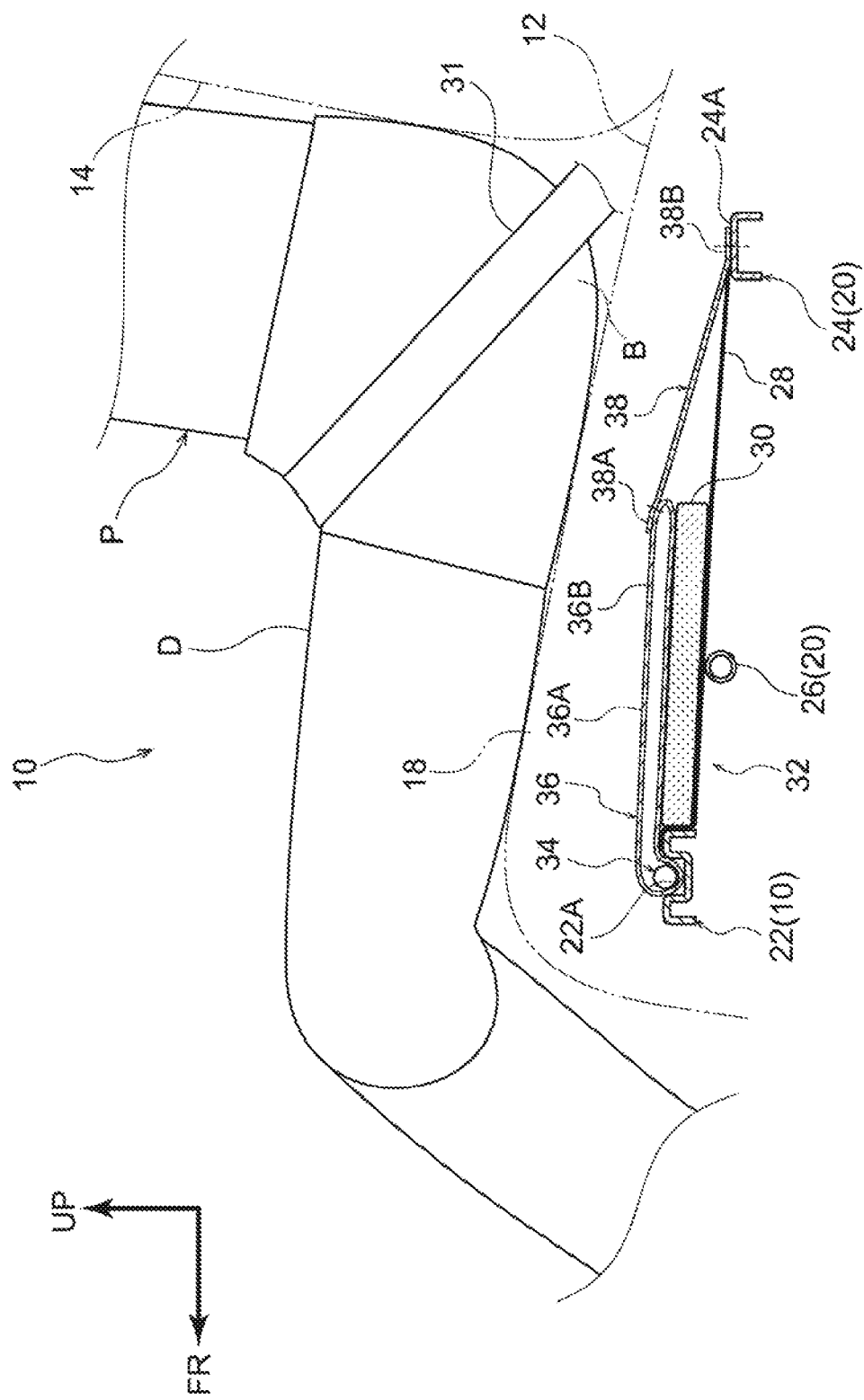
FIG. 4 is a cross-sectional view corresponding to FIG. 2 showing a vehicle seat according to an exemplary embodiment looking from a seat width direction, and showing a state prior to the seat cushion airbag being inflated.

As is shown in FIG. 4, the seat cushion 12 is formed so as to include a seat cushion frame 20 that serves as a frame component, seat cushion springs 28 that are attached to the seat cushion frame 20, and a slab-urethane layer 30.

Figure 3:
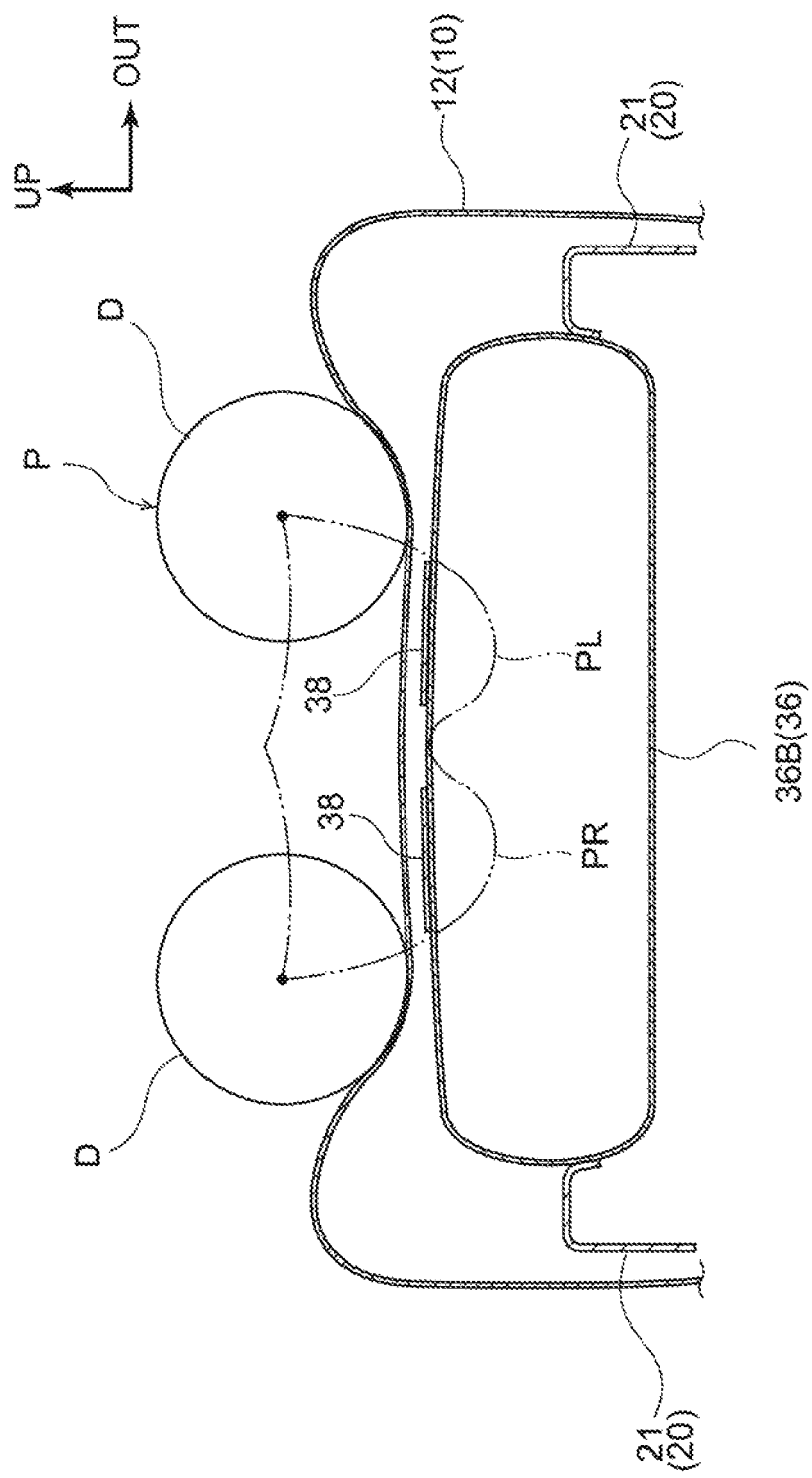
FIG. 3 is a cross-sectional view showing a state across a line 3-3 shown in FIG. 1.

The seat cushion frame 20 is formed so as to include a front frame 22, a rear frame 24, and an anchoring pipe 26 that serves as an anchoring component. Additionally, as is shown in FIG. 3, the seat cushion frame 20 is also formed so as to include side frames 21 that are provided on both sides in the seat width direction of the seat cushion 12 and extend in the seat front-rear direction. As is shown in FIG. 4, the front frame 22 is disposed on the seat front side of the seat cushion 12, and extends in the seat width direction so as to bridge the gap between the side frames 21 (see FIG. 3). A recessed portion 22A that is recessed in a downward direction is formed in an upper surface of the front frame 22, and an inflator 34 (described below) is housed in this recessed portion 22A.

The rear frame 24 is disposed on the seat rear side of the seat cushion 12 and extends in the seat width direction. The rear frame 24 is formed substantially in a vertically inverted U shape when viewed from the seat width direction. Additionally, the rear frame 24 bridges the gap between the side frames 21 (see FIG. 3) in the same way as the front frame 22.

The anchoring pipe 26 is formed substantially in a circular cylinder shape whose axial direction extends in the seat width direction. The anchoring pipe 26 is disposed between the front frame 22 and the rear frame 24, and extends in the seat width direction. Additionally, the anchoring pipe 26 bridges the gap between the side frames 21 (see FIG. 3) in the same way as the front frame 22 and the rear frame 24.

Here, the seat cushion springs 28 bridge the gap between the front frame 22 and the rear frame 24. The seat cushion springs 28 are S-springs that extend in the seat front-rear direction, and a plurality of seat cushion springs 28 are disposed at intervals in the seat width direction. Rear end portions of each one of the seat cushion springs 28 are fixed to an upper surface 24A of the rear frame 24, and a front end portion of each seat cushion spring 28 is fixed to the front frame 22. Furthermore, the seat cushion springs 28 are in contact with an upper end portion of the anchoring pipe 26.

The slab-urethane layer 30 is provided on an upper portion of the seat cushion springs 28. The slab-urethane layer 30 is formed from urethane foam such that it is elastically deformable, and is supported on the seat cushion springs 28. In addition, a seat cushion airbag 36 (described below) is disposed on the seat upper side of the slab-urethane 30.

A cushion pad is provided above the seat cushion frame 20, and this cushion pad is covered on the outside by seat upholstery. Note that a portion of the seat cushion 12 where the seat occupant P sits is formed by a seat portion 18, and a seat cushion airbag device 32 is provided inside this seat portion 18 (i.e., in a seat component). A symbol 31 shown in the drawings indicates a portion of a seat belt that forms a seat occupant restraining device, and is formed by a lap belt that restrains a waist portion of the seat occupant P.

(Seat Cushion Airbag Device)

As is shown in FIG. 1, the seat cushion airbag device 32 of the present exemplary embodiment is formed so as to include the inflator 34, the seat cushion airbag 36, and straps 38.

The inflator 34 is disposed in a seat front end portion inside the seat portion 18 of the seat cushion 12, and is housed within the recessed portion 22A of the front frame 22 (see FIG. 4). The inflator 34 is a substantially circular column-shaped cylinder type of inflator whose axial direction extends in the seat width direction, and a gas injection portion 34A is formed in one end portion in the seat width direction (i.e., in the right-side end portion) of the inflator 34. Additionally, the inflator 34 is formed such that, when the inflator 34 is operated, gas is generated from the gas injection portion 34A.

The inflator 34 is electrically connected to an ECU (Electronic Control Unit) 40. The ECU 40 is electrically connected to a collision detection sensor that detects a vehicle collision, and is formed such that, when a collision or sudden braking of the vehicle is detected based on a signal from this collision detection sensor, the ECU 40 causes the inflator 34 to operate. Note that, for example, an acceleration sensor or the like that detects an acceleration of a vehicle can be used for the collision detection sensor. Moreover, the present disclosure is not limited to using a collision detection sensor, and it is also possible to perform control such that the inflator 34 is operated based on a signal from a collision prediction sensor such as a pre-crash sensor that predicts an impending vehicle collision.

The seat cushion airbag 36 is formed so as to include a first bag portion 36A and a second bag portion 36B, and is formed substantially in a T shape when looked at in plan view. In detail, the first bag portion 36A is disposed on the seat front side inside the seat portion 18 and, when looked at in plan view, is formed in a substantially rectangular shape whose longitudinal direction extends in the seat front-rear direction. Moreover, the first bag portion 36A is disposed in a central portion in the seat width direction of the seat cushion 12, and is located between left and right thigh portions D of the seat occupant P.

The inflator 34 is housed inside a front end portion of the first bag portion 36A. Here, stud bolts protrude towards a downward side from the inflator 34, and the inflator 34 is fastened together with the first bag portion 36A to the front frame 22 (see FIG. 4) by means of these stud bolts. As a consequence, the first bag portion 36A is formed such that, when gas is supplied thereto from the inflator 34, the first bag portion 36A inflates in such a way that the longitudinal direction thereof extends in the seat front-rear direction.

The second bag portion 36B is disposed on the seat rear side of the first bag portion 36A, and communicates with the first bag portion 36A. When looked at in plan view, the second bag portion 36B is formed in a substantially rectangular shape whose longitudinal direction extends in the seat width direction, and a central portion in the seat width direction of the second bag portion 36B communicates with the first bag portion 36A.

Here, the length of the second bag portion 36B in the seat width direction is formed longer than the first bag portion 36A, and both end portions in the seat width direction of the second bag portion 36B are located further to the outer side in the seat width direction than the first bag portion 36A.

Here, a rear end portion of the second bag portion 36B is connected by means of the straps 38 to a rear portion of the seat cushion 12. In detail, the straps 38 are attached to an upper surface of the second bag portion 36B, and these straps 38 are formed in an elongated belt shape whose longitudinal direction extends in the seat front-rear direction. Moreover, in the present exemplary embodiment, as an example, a pair of left and right straps 38 are provided.

As is shown in FIG. 4, a front end portion 38A of the straps 38 is sewn onto the upper surface of the rear end portion of the second bag portion 36B, and a rear end portion 388 of the straps 38 is attached to an upper surface 24A of the rear frame 24.

Figure 2:
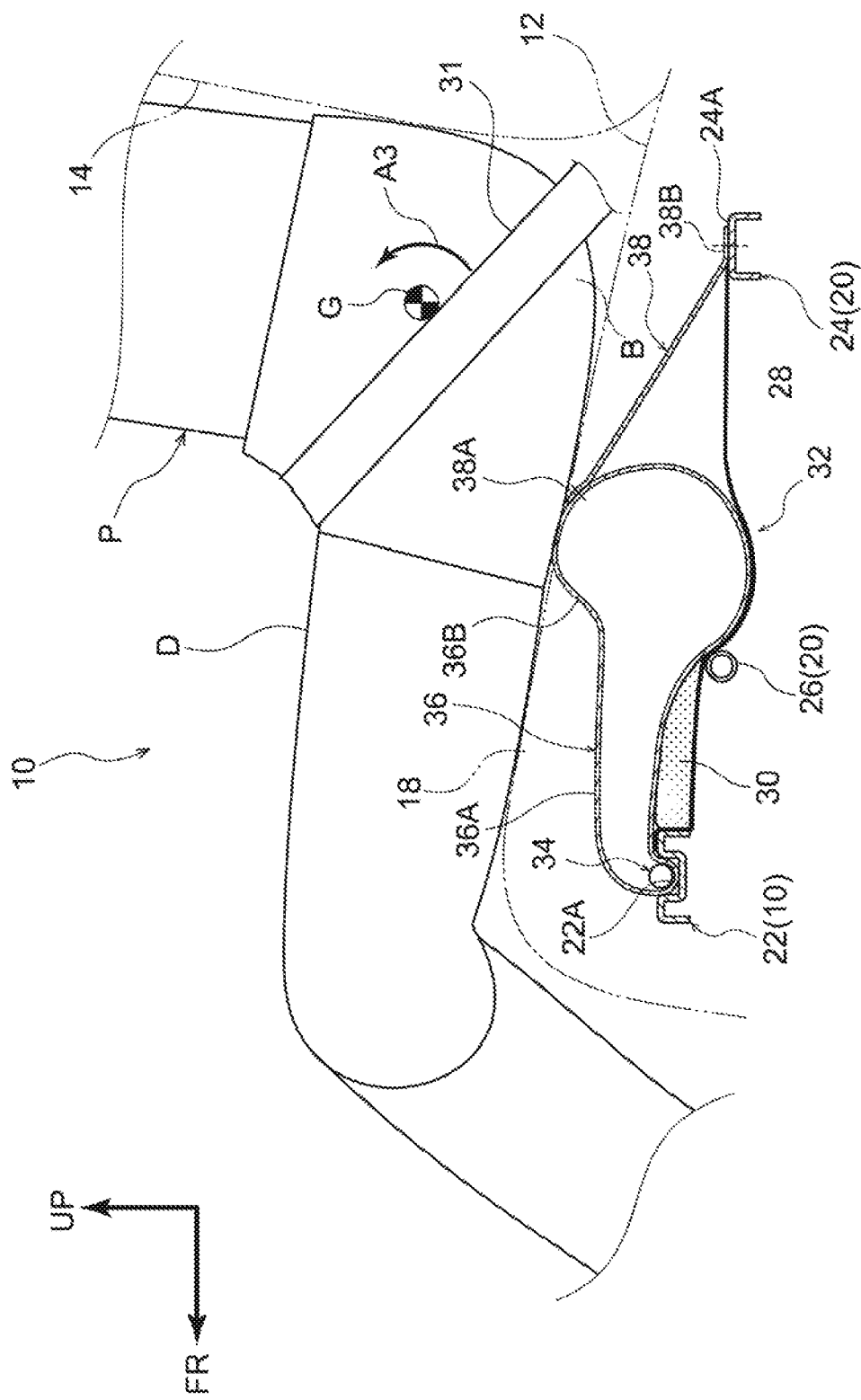
FIG. 2 is a cross-sectional view showing a state across a line 2-2 shown in FIG. 1.

Here, when the inflator 34 is operated from the state shown in FIG. 4, as is shown in FIG. 2, gas is supplied from the inflator 34 to the first bag portion 36A of the seat cushion airbag 36 resulting in the inflation of the first airbag portion 36A. The gas then flows from the first bag portion 36A to the second bag portion 36B so that the second bag portion 36B is inflated on the seat rear side of the first bag portion 36A.

The second bag portion 36B is formed such that, at this time, it inflates so as to be larger in the seat up-down directions than the first bag portion 36A. In addition, the second bag portion 36B is positioned between the anchoring pipe 26 and the buttocks portion B of the seat occupant P, and is formed so as to inflate further to the seat rear side than the anchoring pipe 26. Note that the term used here 'inflates further to the seat rear side' is not limited to structures in which the second bag portion 36B, when this is in an inflated state, and the anchoring pipe 26 are not mutually superimposed when looked at in plan view, and conceptually includes structures in which at least the rear end portion of the second bag portion 36 inflates further to the seat rear side than the anchoring pipe 26.

(Actions and Effects)

Next, actions and effects of the present exemplary embodiment will be described.

In the vehicle seat 10 that is provided with the seat cushion airbag 36 of the present exemplary embodiment, the inflator 34 is operated based on a signal from the ECU 40 (see FIG. 1) in the event of a collision or emergency braking and, as is shown in FIG. 2, the seat cushion airbag 36 is inflated. As a result, the seat cushion 12 is inflated towards the seat upper side, and movement of the seat occupant P towards the seat front side is inhibited.

Here, as is shown in FIG. 1, in the present exemplary embodiment, the first bag portion 36A inflates in such a way that the longitudinal direction thereof extends in the seat front-rear direction when looked at in plan view, and the second bag portion 36B inflates in such a way that the longitudinal direction thereof extends in the seat width direction when looked at in plan view. As a consequence, compared with a structure in which a seat cushion airbag that is substantially rectangular when looked at in plan view is provided, it is possible to improve the ability to restrain a seat occupant in the event of a collision or sudden braking. This effect will now be described via a comparison with a vehicle seat 100 of a comparative example.

As is shown in FIG. 5 and FIG. 6, the vehicle seat 100 of the comparative example is formed in the same way as the vehicle seat 10 of the present exemplary embodiment except that a seat cushion airbag device 102 is provided. In other words, the vehicle seat 100 is formed so as to include the seat cushion 12, the seat back 14, and the headrest 16. In addition, the seat cushion airbag device 102 is provided inside the seat portion 18 of the seat cushion 12.

The seat cushion airbag device 102 is formed so as to include an inflator 104 and a seat cushion airbag 106. The inflator 104 is disposed in a seat front end portion inside the seat portion 18 of the seat cushion 12, and is housed inside the recessed portion 22A of the front frame 22. The inflator 104 is what is known as a cylinder type of inflator having a substantially circular column-shape whose axial direction extends in the seat width direction. A gas injection portion 104A is formed in one end portion in the seat width direction (i.e., in the right-side end portion) of the inflator 104. Additionally, the inflator 104 is formed such that, when the inflator 104 is operated, gas is generated from the gas injection portion 104A. Here, because the seat cushion airbag 106 of the comparative example is larger than the seat cushion airbag 36 of the present exemplary embodiment, the inflator 104 is formed larger than the inflator 34 of the present exemplary embodiment, and generates a greater quantity of gas. Additionally, the inflator 104 is electrically connected to the same type of ECU 40 as in the present exemplary embodiment, and is formed such that, when a collision or sudden braking of the vehicle is detected based on a signal from a collision detection sensor, the ECU 40 causes the inflator 104 to operate.

The seat cushion airbag 106 is formed in a substantially rectangular shape when looked at in plan view, and a front portion of the seat cushion airbag 106 is formed wider than the first bag portion 36A of the present exemplary embodiment. Because of this, the seat cushion airbag 106 of the comparative example is formed such that an area thereof that overlaps with the thigh portion D when looked at in plan view is greater than that of the seat cushion airbag 36 of the present exemplary embodiment. Furthermore, straps are not joined to the seat cushion airbag 106, so that a rear end portion of the seat cushion airbag 106 is able to move towards the seat front side inside the seat portion 18.

In the vehicle seat 100 that is provided with the seat cushion airbag device 102 of the above-described comparative example, when the inflator 104 is operated in the event of a collision or sudden braking and gas is supplied to the seat cushion airbag 106, the seat cushion airbag 106 is inflated in a substantially rectangular shape when looked at in plan view.

As is shown in FIG. 6, as a result of the seat cushion airbag 106 being inflated, the seat cushion 12 is inflated towards the seat upper side, and the thigh portion D of the seat occupant P is lifted up towards the seat upper side (i.e., in the direction shown by an arrow A1 in FIG. 6). Because of this, when viewed from the seat left side, the pelvis of the seat occupant P attempts to rotate clockwise around a center of gravity G, as is shown by an arrow A2 in FIG. 6. Here, in a vehicle in which the instrument panel has been made thinner (i.e., has been miniaturized), it is thought that the lower limbs of the seat occupant cannot be restrained by the instrument panel. In this case, there is a possibility that the pelvis of the seat occupant will rotate in the direction shown by the arrow A2 in FIG. 6, and the lap belt 31 will be shifted from the location of the pelvis.

Moreover, in the seat cushion airbag 106 of the comparative example, because straps are not provided, there are instances when the rear end portion of the seat cushion airbag 106 is pressed by the buttocks portion B of the seat occupant P who is moving inertially towards the seat front side, and is moved towards the seat front side. In this way, in the vehicle seat 100 that is provided with the seat cushion airbag device 102 of the comparative example, if the instrument panel has been made thinner, there is considerable room for improvement from the standpoint of effectively inhibiting inertial movement of the seat occupant P towards the seat front side.

In contrast to the above-described comparative example, in the vehicle seat 10 that is provided with the seat cushion airbag device 32 according to the present exemplary embodiment, as is shown in FIG. 1, because the first bag portion 36A inflates in such a way that the longitudinal direction thereof extends in the seat front-rear direction, the area thereof that overlaps with the thigh portion D of the seat occupant P when looked at in plan view is decreased, and it is possible to inhibit the thigh portion D from being lifted up any more than is necessary. In other words, the pelvis of the seat occupant P can be inhibited from rotating in a clockwise direction when viewed from the seat left side.

Moreover, because a longitudinal direction of the second bag portion 36B extends in the seat width direction, as is shown in FIG. 3, when viewed from the seat front-rear direction, the cross-sectional height of the second bag portion 36B is substantially the same height extending from one end portion thereof in the seat width direction to the other end portion thereof. Consequently, the pelvis (i.e., the ischial bones PR, PL), which is positioned on the seat lower side of the thigh portion D of the seat occupant P when the seat occupant P is in a seated state, can be appropriately held down from the seat front side, and it is possible to inhibit the pelvis from moving towards the seat front side. Namely, as is shown in FIG. 2, because force from the second bag portion 36B towards the seat rear side acts on the buttock portion B of the seat occupant P who is moving inertially towards the seat front side, the pelvis of the seat occupant rotates in the direction shown by the arrow A3 in FIG. 2 thereby increasing the restraining force from the lap belt 31.

As a result, compared with the structure of the comparative example, it is possible to improve the ability to restrain the seat occupant P in the event of a collision or sudden braking.

Moreover, in the present exemplary embodiment, as is shown in FIG. 2, the second bag portion 36B inflates on the seat rear side of the anchoring pipe 26. As a consequence, when the second bag portion 36B is inflating, reaction force is received from the anchoring pipe 26 so that the second bag portion 36B is thereby forced to inflate towards the seat rear side, and inertial movement of the seat occupant P towards the seat front side is inhibited. At this time, the second bag portion 36B is supported from the seat front side by the anchoring pipe 26.

Furthermore, in the present exemplary embodiment, the upper surface of the rear end portion of the second bag portion 36B and the rear portion of the seat cushion 12 (i.e., the rear frame 24) are joined in the front-rear direction by the straps 38. As a consequence, when the pelvis of the seat occupant P who moves towards the seat front side in the event of a collision or sudden braking is being held down by the second bag portion 36B, the second bag portion 36B is inhibited from moving toward the seat front side by the straps 38.

In particular, in the present exemplary embodiment, as is shown in FIG. 1 and FIG. 3, the positions of the straps 38 are provided at the positions of the left and right ischial bones PR, PL of the pelvis of the seat occupant P. In other words, when looked at in plan view, the straps 38 are disposed such that they overlap with the ischial bones PR and PL. As a consequence, the portions of the ischial bones PR, PL where the load from the second bag portion 36B is applied can be effectively pulled towards the seat rear side by the straps 38.

Furthermore, in the present exemplary embodiment, the front end portion 38A of each strap 38 is joined to the upper surface of the second bag portion 36B. As a consequence, when the second bag portion 36B is inflating, the second bag portion 36B can be held down from the seat upper side by the straps 38, so that the second bag portion 36B can be inhibited from overinflating towards the seat upper side. As a result, movement of the second bag portion 36B towards the seat front side is inhibited, and the thigh portion D of a seat occupant P is inhibited from being lifted up any more than is necessary.

Furthermore, in the present exemplary embodiment, as is shown in FIG. 1, the overall shape of the seat cushion airbag 36 is formed substantially in a T shape when looked at in plan view. Accordingly the volume thereof is reduced compared to the seat cushion airbag 106 of the comparative example, which is formed in a substantially rectangular shape when looked at in plan view. As a consequence, the size of the inflator 34 can be reduced, and both a reduction in cost and an improvement in space saving can be achieved.

A vehicle seat 10 according to the exemplary embodiment has been described above, however, the present disclosure may be implemented in a variety of forms insofar as these do not depart from the spirit or scope of the present disclosure. For example, in the present exemplary embodiment, the length (i.e., the width) of the first bag portion 36A in the seat width direction and the length (i.e., the width) of the second bag portion 26B in the seat front-rear direction are substantially the same lengths, however, the present disclosure is not limited to this. It is also possible to extend the length of the first bag portion 36A in the seat width direction so that the first bag portion 36A overlaps with the thigh portion D of the seat occupant PI when looked at in plan view, as shown in FIG. 7 for example. In this case, because the flow path of the gas to the second bag portion 36B is expanded, gas can be supplied more rapidly to the second bag portion 36B when the inflator 34 is operated.

Moreover, in the present exemplary embodiment, a pair of left and right straps 38 are provided, however, the present disclosure is not limited to this. For example, it is also possible to employ a structure in which a central portion in the seat width direction of the second bag portion 36B is pulled towards the seat rear side by a single strap.

Furthermore, in the present exemplary embodiment, as is shown in FIG. 2, the front end portion 38A of each strap 38 is sewn to the upper surface of the rear end portion of the second bag portion 36B, however, the present disclosure is not limited to this. For example, it is also possible for the front end portion 38A of each strap 38 to be sewn to a central portion in the seat up-down direction of the rear end portion of the second bag portion 36B. It is also possible to employ a structure in which a separate strap from the straps 38 is sewn to a lower surface of the rear end portion of the second bag portion 36B, and the second bag portion 36B is sandwiched from above and below by this strap and the straps 38.

It is an object of the present disclosure to provide a vehicle seat and seat cushion airbag that enable the ability to restrain a seat occupant in the event of a vehicle collision or sudden braking to be improved.

A first aspect of a vehicle seat includes: an inflator that is disposed at a seat front end portion, inside a seat portion of a seat cushion, and that generates gas by operating; a first bag portion that is disposed inside the seat portion, that internally houses the inflator, and that, by being supplied with gas from the inflator, is inflated in a longitudinal direction, which is a seat front-rear direction; and a second bag portion that is disposed inside the seat portion on a seat rear side of the first bag portion and communicates with the first bag portion, that has a longitudinal direction extending in a seat width direction, and that has a length in the seat width direction which is longer than that of the first bag portion.

In the first aspect, an inflator, a first bag portion, and a second bag portion are provided inside a seat portion of a seat cushion, and the first bag portion is inflated as a result of gas being supplied thereto from the inflator. Additionally, the second bag is disposed at a seat rear side of the first bag portion and is in communication with the first bag portion. Because of this, the second bag portion is inflated when supplied with gas from the inflator via the first beg portion. As a result of the first bag portion and the second bag being inflated in this manner, the seat cushion is made to expand towards the seat upper side so that movement of a seat occupant towards the seat front side is inhibited.

Here, because the first bag portion inflates in such a way that a longitudinal direction thereof extends in a seat front-rear direction, compared with a seat cushion airbag having a substantially rectangular shape when looked at in plan view, the area thereof that overlaps with the thigh portion of a seat occupant is reduced, and it is possible to inhibit the thigh portion of a seat occupant from being lifted up any more than is necessary. Moreover, because a longitudinal direction of the second bag portion extends in the seat width direction, and the length of the second bag portion in the seat width direction is longer than that of the first bag portion, when viewed from the seat front-rear direction, a cross-sectional height of the second bag portion is substantially the same height extending from one end portion thereof in the seat width direction to the other end portion thereof. Consequently, compared with a typical structure in which the cross-section has an elliptical shape when viewed from the seat front-rear direction, the pelvis of a seat occupant, which is positioned on the seat lower side of the thigh portion when the seat occupant is in a seated state, can be appropriately held down from the seat front side. As a result, it is possible to inhibit the pelvis of a seat occupant from moving towards the seat front side. Note that the term used above, 'substantially the same height' is not strictly limited to structures in which end portions in the seat width direction and a central portion in the seat width direction are the same height. In other words, this term includes structures in which there may be a slight difference in height between end portions in the seat width direction and a central portion in the seat width direction compared with structures in which the cross-section has an elliptical shape when viewed from the seat front-rear direction.

A second aspect is the vehicle seat of the first aspect, wherein: the seat cushion includes a front frame having a seat front side that extends in the seat width direction, and a rear frame having a seat rear side that extends in the seat width direction, an anchoring component that extends in the seat width direction is provided between the front frame and the rear frame, and the second bag portion is disposed between the anchoring component and a position that corresponds to a buttocks portion of a seat occupant in a case in which the seat occupant is seated in the vehicle seat, and inflates further to a seat rear side than the anchoring component.

In the second aspect, the second bag portion is disposed between an anchoring component that extends in the seat width direction and the buttocks portion of a seat occupant, and this second bag portion inflates on the seat rear side of the anchoring component. Consequently, when the second bag portion is inflating, reaction force is received from the anchoring component so that the second bag portion is thereby forced to inflate towards the seat rear side, and inertial movement of the seat occupant towards the seat front side is inhibited. At this time, the second bag portion is supported from the seat front side by the anchoring component.

A third aspect is the vehicle seat of the first or the second aspect, wherein a seat rear end portion of the second bag portion is joined by straps to a rear portion of the seat cushion.

In the third aspect, in the event of a collision or sudden braking, when the pelvis of a seat occupant who is moving towards the seat front side is being held down by the second bag portion, the second bag portion is inhibited from moving towards the seat front side by straps.

A fourth aspect is the vehicle seat of the third aspect, wherein the straps are joined to an upper surface of the seat rear end portion of the second bag portion.

In the fourth aspect, the straps are joined to an upper surface of the second bag portion. As a consequence, when the second bag portion is inflating, the second bag portion is held down from the seat upper side thereof by the straps, so that the second bag portion can be inhibited from overinflating towards the seat upper side.

A fifth aspect is a seat cushion airbag that is disposed inside a seat portion of a seat cushion. The seat cushion airbag includes: a first bag portion that has a longitudinal direction extending in a seat front-rear direction, and that inflates by being supplied with gas from an inflator, and a second bag portion that is disposed on a seat rear side of the first bag portion and communicates with the first bag portion, that has a longitudinal direction extending in the seat width direction, and that has a length in the seat width direction which is longer than that of the first bag portion.

In the fifth aspect, because the first bag portion is formed in such a way that the longitudinal direction thereof extends in the seat front-rear direction, the area thereof that overlaps with the thigh portion of a seat occupant is reduced compared to a seat cushion airbag having a substantially rectangular shape when looked at in plan view, and it is possible to inhibit the thigh portion of a seat occupant from being lifted up any more than is necessary. Additionally, because the longitudinal direction of the second bag portion extends in the seat width direction, and the length of the second bag portion in the seat width direction is longer than that of the first bag portion, when viewed from the seat front-rear direction, a cross-sectional height of the second bag portion is substantially the same height extending from one end portion thereof in the seat width direction to the other end portion thereof. Consequently, the pelvis of a seat occupant, which is positioned on the seat lower side of the thigh portion when the seat occupant is in a seated state, can be appropriately held down from the seat front side, and it is possible to inhibit the pelvis of a seat occupant from moving towards the seat front side.

A sixth aspect is the seat cushion airbag of the fifth aspect, wherein an upper surface of a seat rear end portion of the second bag portion is joined to end portions of straps, other end portions of the straps being joined to a rear portion of the seat cushion.

In the sixth aspect, in the event of a collision or sudden braking, when the pelvis of a seat occupant who is moving towards the seat front side is being held down by the second bag portion, the second bag portion is inhibited from moving towards the seat front side by straps. Moreover, when the second bag portion is inflating, the second bag portion is held down from the seat upper side thereof by the straps, so that the second bag portion can be inhibited from overinflating towards the seat upper side.

According to the vehicle seat of the first aspect, it is possible to improve the ability to restrain a seat occupant in the event of a collision or sudden braking.

According to the vehicle seat of the second aspect, it is possible to effectively inhibit the pelvis of a seat occupant from moving towards the seat front side.

According to the vehicle seat of the third aspect, it is possible to inhibit the second bag portion from moving towards the seat front side.

According to the vehicle seat of the fourth aspect, it is possible to inhibit the thigh portion of a seat occupant from being lifted up any more than is necessary.

According to the seat cushion airbag of the fifth aspect, it is possible to improve the ability to restrain a seat occupant in the event of a collision or sudden braking.

According to the seat cushion airbag of the sixth aspect, it is possible to inhibit the second bag portion from moving towards the seat front side, and it is also possible to inhibit the thigh portion of a seat occupant from being lifted up any more than is necessary.

What is claimed is:

1. A vehicle seat comprising:
    an inflator that is disposed at a seat front end portion, inside a seat portion of a seat cushion, and is configured to supply gas by operating;
    a first bag portion that is disposed inside the seat portion, that internally houses the inflator, and that, by being supplied with gas from the inflator, is configured to be inflated in a longitudinal direction, which is a seat front-rear direction;
    a second bag portion that is disposed inside the seat portion on a seat rear side of the first bag portion and communicates with the first bag portion, that has a longitudinal direction extending in a seat width direction, and that has a length in the seat width direction which is longer than that of the first bag portion; and a strap that is attached to the second bag portion at one end, and attached to a frame at another end.

2. The vehicle seat according to claim 1, wherein:

the seat cushion includes a front frame having a seat front side that extends in the seat width direction, and the frame is a rear frame having a seat rear side that extends in the seat width direction, an anchoring component that extends in the seat width direction is provided between the front frame and the rear frame, and the second bag portion is disposed between the anchoring component and a rear side of the seat portion, and inflates further to a seat rear side than the anchoring component.

3. The vehicle seat according to claim 1, wherein the first bag portion has a length in the seat width direction that crosses a centerline that bisects the seat portion along the seat front-rear direction.

4. The vehicle seat according to claim 1, wherein a plurality of straps, including the strap, are attached to the second bag portion at the one end, and attached to the frame at the another end.

5. The vehicle seat according to claim 1, wherein the first bag portion and the second bag portion collectively form a T shaped bag portion.

6. A vehicle seat comprising:

an inflator that is disposed at a seat front end portion, inside a seat portion of a seat cushion, and that is configured to supply gas by operating;

a first bag portion that is disposed inside the seat portion, that internally houses the inflator, and that, by being supplied with gas from the inflator, is configured to be inflated in a longitudinal direction, which is a seat front-rear direction; and a second bag portion that is disposed inside the seat portion on a seat rear side of the first bag portion and communicates with the first bag portion, that has a longitudinal direction extending in a seat width direction, and that has a length in the seat width direction which is longer than that of the first bag portion, wherein a seat rear end portion of the second bag portion is joined by straps to a rear portion of the seat cushion.

7. The vehicle seat according to claim 6, wherein the straps are joined to an upper surface of the seat rear end portion of the second bag portion.

8. A seat cushion airbag that is disposed inside a seat portion of a seat cushion, the seat cushion airbag comprising:

a first bag portion that has a longitudinal direction extending in a seat front-rear direction, and that is configured to be inflated by being supplied with gas from an inflator;

a second bag portion that is disposed on a seat rear side of the first bag portion and communicates with the first bag portion, that has a longitudinal direction extending in a seat width direction, and that has a length in the seat width direction which is longer than that of the first bag portion; and a strap that is attached to the second bag portion at one end, and attached to a frame at another end.

9. The seat cushion airbag according to claim 8, wherein an upper surface of a seat rear end portion of the second bag portion is joined to end portions of straps, other end portions of the straps being joined to a rear portion of the seat cushion.

10. The seat cushion airbag according to claim 8, wherein a central portion in a seat up-down direction of a seat rear end portion of the second bag portion is joined to end portions of straps, other end portions of the straps being joined to a rear portion of the seat cushion.

11. The seat cushion airbag according to claim 8, wherein a length in the seat width direction of the first bag portion is longer than a length in the seat front-rear direction of the second bag portion.

12. The seat cushion airbag according to claim 8, wherein a plurality of straps, including the strap, are attached to the second bag portion at the one end, and attached to the frame at the another end.

13. The seat cushion airbag according to claim 8, wherein the first bag portion and the second bag portion collectively form a T shaped bag portion.

* * * * *